(12) United States Patent
Ohmi et al.

(10) Patent No.: US 10,466,387 B2
(45) Date of Patent: Nov. 5, 2019

(54) ARRANGEMENT STRUCTURE FOR VICINITY INFORMATION DETECTION SENSOR

(71) Applicant: TOYOTA JIDOSHA KABUSHIKI KAISHA, Toyota-shi (JP)

(72) Inventors: Masanobu Ohmi, Kasugai (JP); Seiji Yamamoto, Seto (JP); Yoshiaki Matsumura, Toyota (JP); Kosuke Sakakibara, Toyota (JP); Kazuki Sugie, Miyoshi (JP); Misato Kinoshita, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 186 days.

(21) Appl. No.: 15/482,116

(22) Filed: Apr. 7, 2017

(65) Prior Publication Data
US 2017/0299769 A1    Oct. 19, 2017

(30) Foreign Application Priority Data

Apr. 19, 2016  (JP) .................................. 2016-083517

(51) Int. Cl.
*G01V 11/00*     (2006.01)
*B60K 15/063*    (2006.01)
(Continued)

(52) U.S. Cl.
CPC .......... *G01V 11/002* (2013.01); *B60K 15/063* (2013.01); *B60K 15/07* (2013.01);
(Continued)

(58) Field of Classification Search
CPC .............. B60K 15/07; B60K 15/03006; B60K 15/063; B60K 2015/0639; B60K 2015/03118; B60K 2015/03309
See application file for complete search history.

(56) References Cited

U.S. PATENT DOCUMENTS 3,589,768  A  *  6/1971  Wilson ...................... B60P 7/08
                                                              296/24.4
D233,817   S  * 12/1974  Mathews et al. ........... D6/682.3
(Continued)

FOREIGN PATENT DOCUMENTS

DE     1916508 A1 * 10/1970  ........... B29C 65/645
DE     3824895 A1 *  1/1990  .......... E04F 13/0808
(Continued)

OTHER PUBLICATIONS

Machine translation of JP 2000-225855 A which originally published on Aug. 15, 2000.*
Compressed gas cylinder rack photo, JonTammy, Apr. 9, 2015.*

*Primary Examiner* — David A Rogers
(74) *Attorney, Agent, or Firm* — Oblon, McClelland, Maier & Neustadt, L.L.P.

(57) ABSTRACT

An arrangement structure for a vicinity information detection sensor, the arrangement structure comprising: a vicinity information detection sensor provided on a roof of a fuel cell bus; and an obstruction portion provided between the vicinity information detection sensor and a hydrogen tank disposed on the roof, the obstruction portion obstructing the hydrogen tank from coming into contact with the vicinity information detection sensor.

4 Claims, 5 Drawing Sheets

(51) Int. Cl.
  *B60K 15/07* (2006.01)
  *B60K 15/03* (2006.01)
(52) U.S. Cl.
  CPC ............ *B60K 2015/03118* (2013.01); *B60K 2015/03315* (2013.01); *B60K 2015/0639* (2013.01); *B60Y 2200/143* (2013.01)

(56) References Cited

U.S. PATENT DOCUMENTS

| | | | | |
|---|---|---|---|---|
| 4,182,455 | A * | 1/1980 | Zurawin | A47F 7/283 211/69.8 |
| 4,382,733 | A * | 5/1983 | Rodgers | B65D 19/0095 108/55.3 |
| 4,787,514 | A * | 11/1988 | Shepherd | A47B 81/007 206/427 |
| 4,875,730 | A * | 10/1989 | Justice | B60P 7/14 296/37.5 |
| 4,887,947 | A * | 12/1989 | Bott | B60P 7/14 410/144 |
| 4,898,282 | A * | 2/1990 | Hawkinson | A47F 1/126 211/49.1 |
| 4,971,275 | A * | 11/1990 | Roberts | B63C 11/02 248/152 |
| 5,035,184 | A * | 7/1991 | Bott | B60P 7/135 104/121 |
| 5,054,668 | A * | 10/1991 | Ricchiuti | B60R 7/02 206/818 |
| 5,161,700 | A * | 11/1992 | Stannis | B60R 7/02 211/175 |
| 5,167,479 | A * | 12/1992 | Bott | B01D 53/485 224/42.33 |
| 5,240,301 | A * | 8/1993 | Arnold | B60P 7/14 220/533 |
| 5,259,712 | A * | 11/1993 | Wayne | B60R 13/01 410/129 |
| 5,626,380 | A * | 5/1997 | Elson | B60R 7/02 296/37.1 |
| 5,715,978 | A * | 2/1998 | Ackeret | B60P 7/0815 224/310 |
| 5,785,471 | A * | 7/1998 | Godbersen | B60P 3/062 410/11 |
| 6,367,573 | B1 * | 4/2002 | Scott | B60K 15/03006 137/267 |
| 6,536,722 | B2 * | 3/2003 | Sadowski | F17C 13/084 248/154 |
| 6,974,170 | B2 * | 12/2005 | Mulvihill | B60P 7/0892 224/42.33 |
| 6,986,541 | B1 * | 1/2006 | Haack | B62D 33/02 224/404 |
| 7,137,474 | B2 * | 11/2006 | Yokote | F17C 13/084 180/314 |
| 7,244,084 | B2 * | 7/2007 | Anthony | B60P 7/12 410/36 |
| 7,661,240 | B2 * | 2/2010 | Sargent | F16L 3/137 248/146 |
| D661,371 | S * | 6/2012 | Willard | D23/206 |
| 9,114,930 | B2 * | 8/2015 | Simmons | B60K 15/07 |
| 9,255,506 | B2 * | 2/2016 | Cook | F01N 3/20 |
| 9,260,009 | B2 * | 2/2016 | Mizuno | B60K 15/07 |
| 9,340,108 | B2 * | 5/2016 | Goedken | B60K 15/07 |
| 9,528,271 | B2 * | 12/2016 | Rook | E04H 12/12 |
| 9,981,551 | B2 * | 5/2018 | McKinney | B65F 3/00 |
| 2003/0006349 | A1 * | 1/2003 | Sadowski | F17C 13/084 248/154 |
| 2003/0034664 | A1 * | 2/2003 | Wayne | B60R 11/06 296/39.2 |
| 2004/0026346 | A1 * | 2/2004 | Kelly | A47B 81/007 211/74 |
| 2004/0026427 | A1 * | 2/2004 | Shigematsu | B60K 15/03006 220/562 |
| 2007/0206324 | A1 * | 9/2007 | Donnell | A47B 81/007 360/133 |
| 2008/0006461 | A1 * | 1/2008 | Naganuma | B60H 1/00371 180/69.4 |
| 2008/0044249 | A1 * | 2/2008 | Lim | B60R 7/02 410/94 |
| 2008/0061212 | A1 * | 3/2008 | Conforti | B65D 90/12 248/634 |
| 2008/0156809 | A1 * | 7/2008 | Mizuno | B60K 15/07 220/562 |
| 2009/0152043 | A1 * | 6/2009 | Lee | B60K 15/07 180/314 |
| 2012/0280481 | A1 * | 11/2012 | Gentry | B60J 7/1607 280/834 |
| 2013/0332061 | A1 | 12/2013 | Dowdall et al. | |
| 2014/0261073 | A1 * | 9/2014 | Cook | F01N 3/20 105/392.5 |
| 2015/0034787 | A1 * | 2/2015 | Ramini | F17C 13/084 248/346.05 |
| 2015/0337710 | A1 * | 11/2015 | Cook | F01N 3/20 60/274 |
| 2015/0372322 | A1 * | 12/2015 | Shimoyana | B66F 9/07518 429/515 |
| 2016/0303965 | A1 * | 10/2016 | Sloan | B60K 15/063 |
| 2018/0178732 | A1 * | 6/2018 | Bathelier | B60R 7/02 |

FOREIGN PATENT DOCUMENTS

| | | | | |
|---|---|---|---|---|
| FR | 2434690 A1 | * | 3/1980 | ............ B28B 7/02 |
| FR | 3022196 B1 | * | 2/2018 | ............ B60P 1/365 |
| GB | 2386463 A | * | 9/2003 | |
| JP | 11-348839 A | | 12/1999 | |
| JP | 2000-225855 A | | 8/2000 | |
| JP | 2000127860 A | * | 9/2000 | |
| JP | 2001239845 A | * | 9/2001 | |
| JP | 3596277 B2 | * | 12/2004 | |
| JP | 3672445 B2 | * | 7/2005 | ............ B60K 15/07 |
| JP | 3690783 B2 | * | 8/2005 | |
| JP | 2005-291808 | | 10/2005 | |
| JP | 3773365 B2 | * | 5/2006 | |
| JP | 2010-276059 | | 12/2010 | |
| JP | 2015-531095 A | | 10/2015 | |
| KR | 20040080566 A | * | 9/2004 | |

* cited by examiner

ARRANGEMENT STRUCTURE FOR VICINITY INFORMATION DETECTION SENSOR

CROSS-REFERENCE TO RELATED APPLICATION

This application is based on and claims priority under 35 USC 119 from Japanese Patent Application No. 2016-083517 filed on Apr. 19, 2016, the disclosure of which is incorporated by reference herein.

TECHNICAL FIELD

The present invention relates to an arrangement structure for a vicinity information detection sensor of a fuel cell bus.

BACKGROUND ART

A structure has been known since heretofore (for example, see Japanese Patent Application Laid-Open (JP-A) No. 2005-291808).

In Japanese Patent Application Laid-Open (JP-A) No. 2005-291808, information about the vicinity of a vehicle is detected by an on-board radar device (vicinity information detection sensor) disposed on a roof of the vehicle.

SUMMARY OF INVENTION

Technical Problem

However, in the case of a fuel cell bus featuring an autonomous driving system in which a hydrogen tank is disposed on the roof together with a vicinity information detection sensor, if a fixing of the hydrogen tank is detached during running in an autonomous driving mode, it is possible that the hydrogen tank may roll on the roof and strike (come into contact with) the vicinity information detection sensor. That is, there is a risk of the vicinity information detection sensor being damaged by the rolling hydrogen tank.

If the vicinity information detection sensor is damaged and cannot detect vicinity information, then even if the detachment of the fixing of the hydrogen tank during running in the autonomous driving mode is detected, it may not be possible to autonomously transition to retreat running. Consequently, it is possible that the autonomous driving mode will be urgently terminated and that the fuel cell bus will make an emergency stop at an unsuitable location such as in the middle of a road, within an intersection or the like.

Accordingly, an object of the present invention is to provide an arrangement structure for a vicinity information detection sensor of a fuel cell bus featuring an autonomous driving system in which a hydrogen tank is disposed on a roof together with the vicinity information detection sensor, with which arrangement structure for a vicinity information detection sensor the hydrogen tank may be prevented from striking the vicinity information detection sensor even if a fixing of the hydrogen tank detaches during running in an autonomous driving mode.

Solution to Problem

In order to achieve the object described above, an arrangement structure for a vicinity information detection sensor of a first aspect relating to the present invention includes: a vicinity information detection sensor provided on a roof of a fuel cell bus; and an obstruction portion provided between the vicinity information detection sensor and a hydrogen tank disposed on the roof, the obstruction portion obstructing the hydrogen tank from coming into contact with the vicinity information detection sensor.

According to the first aspect relating to the present invention, the obstruction portion that obstructs the hydrogen tank from coming into contact with the vicinity information detection sensor is provided between the vicinity information detection sensor provided on the roof and the hydrogen tank disposed on the roof. Therefore, even if a fixing of the hydrogen tank detaches during running of the fuel cell bus in an autonomous driving mode, the hydrogen tank may be prevented from striking against the vicinity information detection sensor.

In an arrangement structure for a vicinity information detection sensor of a second aspect relating to the present invention, in the arrangement structure for a vicinity information detection sensor of the first aspect relating to the present invention, the obstruction portion is a barrier wall that is fixed on the roof.

According to the second aspect relating to the present invention, because the obstruction portion is the barrier wall that is fixed on the roof, the hydrogen tank is more effectively obstructed from coming into contact with the vicinity information detection sensor than in a structure in which the obstruction portion is not a barrier wall that is fixed on the roof.

In an arrangement structure for a vicinity information detection sensor of a third aspect relating to the present invention, in the arrangement structure for a vicinity information detection sensor of the second aspect relating to the present invention, the barrier wall is formed with an inverted U-shaped cross section.

According to the third aspect relating to the present invention, because the barrier wall is formed with an inverted U-shaped cross section, stiffness of the barrier wall is enhanced compared to a structure in which a barrier wall is not formed with an inverted U-shaped cross section. Thus, the hydrogen tank is even more effectively obstructed from coming into contact with the vicinity information detection sensor.

In an arrangement structure for a vicinity information detection sensor of a fourth aspect relating to the present invention, in the arrangement structure for a vicinity information detection sensor of the first aspect relating to the present invention, the hydrogen tank is covered by a cover body provided on the roof and the obstruction portion is a wall portion of the cover body that opposes the vicinity information detection sensor.

According to the fourth aspect relating to the present invention, because the hydrogen tank is covered by the cover member provided on the roof and the obstruction portion is the wall portion of the cover body that opposes the vicinity information detection sensor, the hydrogen tank is obstructed from coming into contact with the vicinity information detection sensor more efficiently (i.e., without an increase in the number of components) than in a structure in which the obstruction portion is not a wall portion of a cover body that opposes the vicinity information detection sensor.

In an arrangement structure for a vicinity information detection sensor of a fifth aspect relating to the present invention, in the arrangement structure for a vicinity information detection sensor of the fourth aspect relating to the present invention, at least the wall portion of the cover body is reinforced.

According to the fifth aspect relating to the present invention, because at least the wall portion of the cover body that opposes the vicinity information detection sensor is reinforced, stiffness of the wall portion is enhanced and the hydrogen tank is even more effectively obstructed from coming into contact with the vicinity information detection sensor.

Advantageous Effects of Invention

According to the first aspect relating to the present invention, even if a fixing of the hydrogen tank detaches during running of the fuel cell bus in the autonomous driving mode, the hydrogen tank may be prevented from striking the vicinity information detection sensor.

According to the second aspect relating to the present invention, the hydrogen tank may be effectively obstructed from coming into contact with the vicinity information detection sensor.

According to the third aspect relating to the present invention, stiffness of the barrier wall may be enhanced and the hydrogen tank may be more effectively obstructed from coming into contact with the vicinity information detection sensor.

According to the fourth aspect relating to the present invention, the hydrogen tank may be obstructed from coming into contact with the vicinity information detection sensor efficiently.

According to the fifth aspect relating to the present invention, the stiffness of the wall portion may be enhanced and the hydrogen tank may be more effectively obstructed from coming into contact with the vicinity information detection sensor.

DESCRIPTION OF EMBODIMENTS

Herebelow, an exemplary embodiment relating to the present invention is described in detail in accordance with the drawings. For convenience of description, the arrow UP that is shown where appropriate in the drawings indicates a vehicle body upper direction, the arrow FR indicates a vehicle body front direction, and the arrow LH indicates a vehicle body left direction. In the following descriptions, where the directions up and down, front and rear, and left and right are recited without being particularly specified, the same represent up and down in the vehicle body vertical direction, front and rear in the vehicle body front-and-rear direction, and left and right in the vehicle body left-and-right direction (the vehicle width direction).

—First Exemplary Embodiment—

Figure 1:
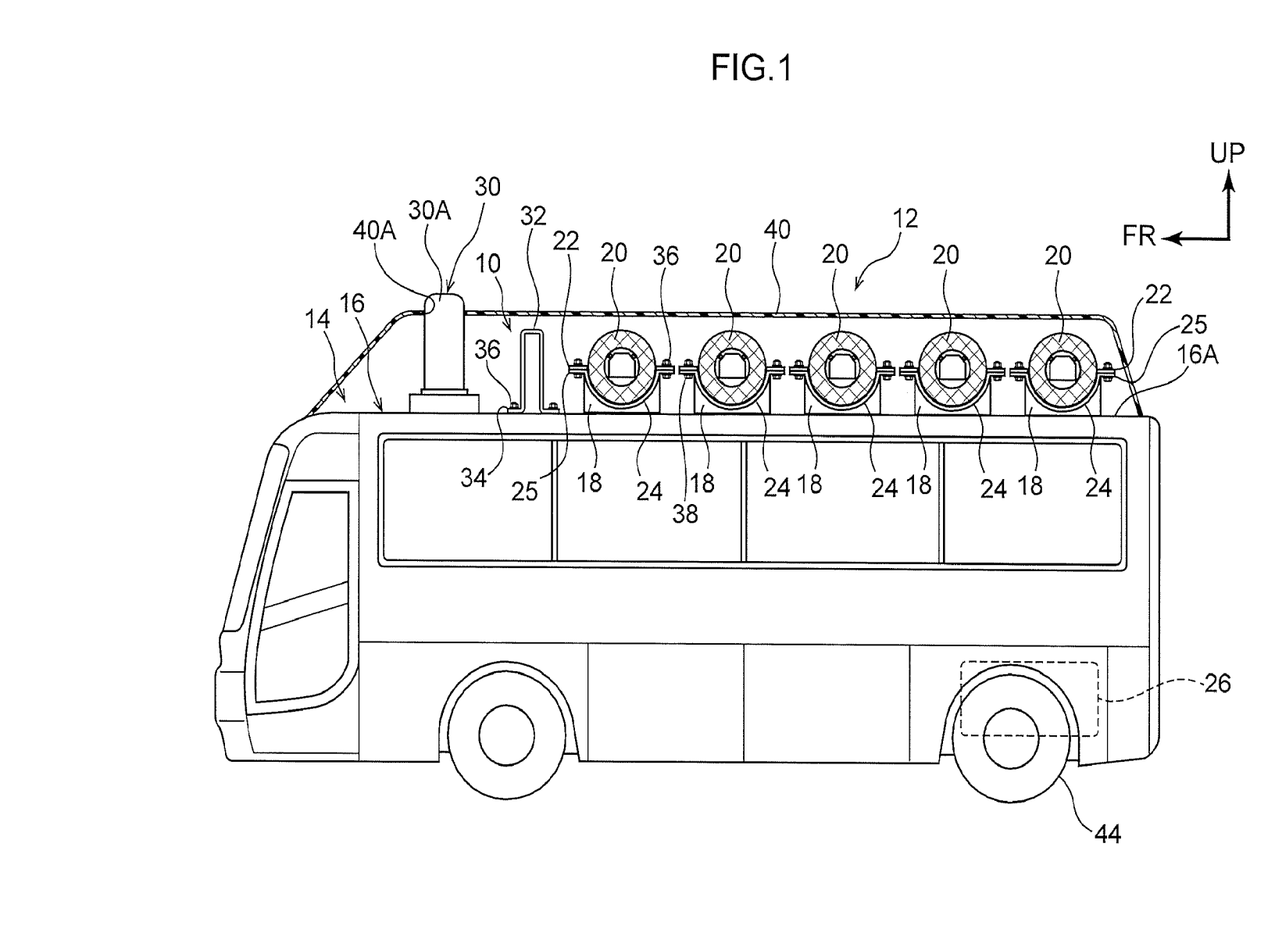
FIG. 1 is a side view showing a fuel cell bus that is equipped with an arrangement structure for a vicinity information detection sensor in accordance with a first exemplary embodiment.
Figure 2:
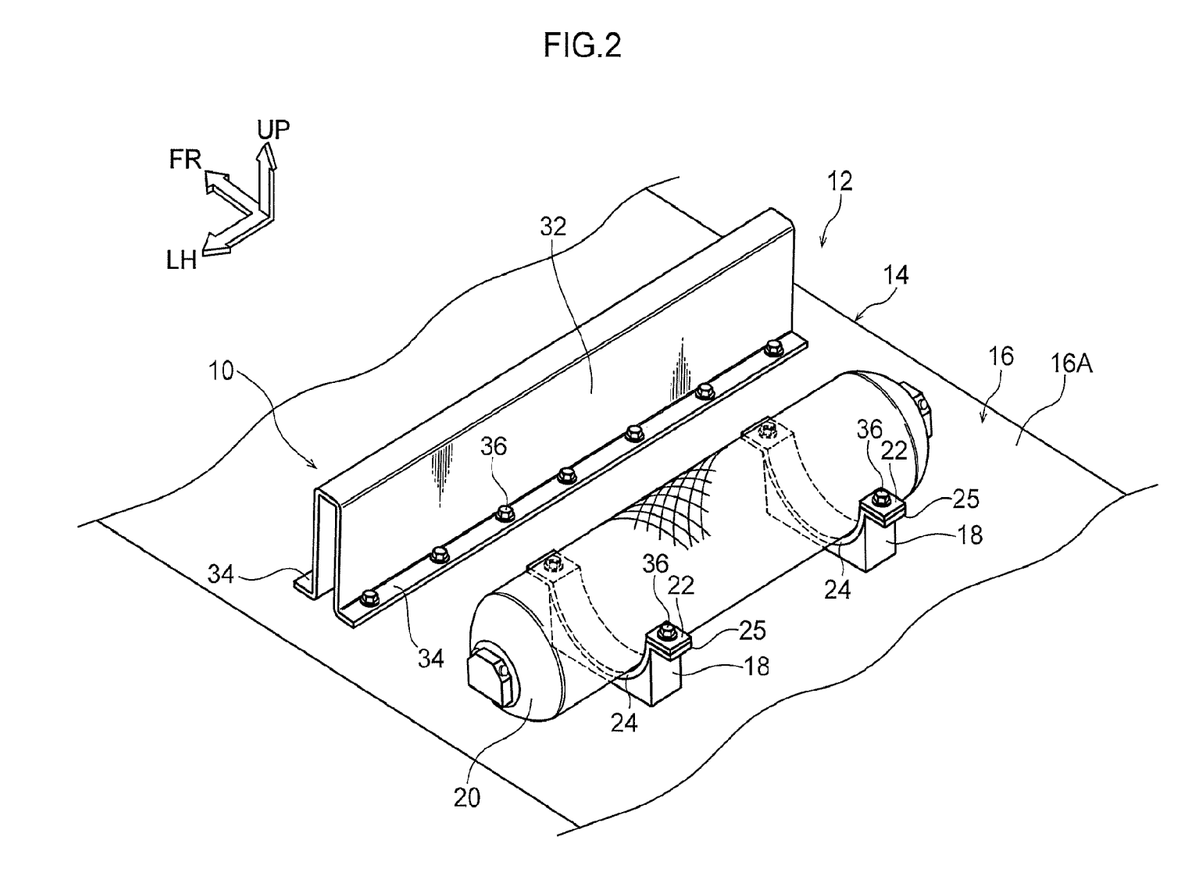
FIG. 2 is a magnified perspective view showing a hydrogen tank and barrier wall that are disposed on a roof of the fuel cell bus equipped with the arrangement structure for a vicinity information detection sensor in accordance with the first exemplary embodiment.

First, an arrangement structure 10 of a vicinity information detection sensor 30 according to a first exemplary embodiment is described. As shown in FIG. 1, in order to assure space for vehicle occupants in a fuel cell bus 12, hydrogen tanks 20 are disposed on a roof 14 of the fuel cell bus 12. As shown in FIG. 2, each hydrogen tank 20 is formed in a shape in which each of two axial direction end portions of a substantially cylindrical main body portion is integrally closed off by a respective hemispherical closing member. A plural number (for example, five) of the hydrogen tanks 20 are disposed in a row in the vehicle body front-and-rear direction, with the axial directions thereof set in the vehicle width direction, on an upper face 16A of a roof panel 16 structuring the roof 14. The roof panel 16 is fabricated of metal.

To describe this in more specific terms, as shown in FIG. 1 and FIG. 2, a plural number of left and right pairs of seats 18 are provided on the upper face 16A of the roof panel 16 in the row in the vehicle body front-and-rear direction. The left and right seats 18 of each pair are separated in the vehicle width direction. A semi-circular arc-shaped holder 24 is integrally provided on an upper face of each seat 18. The holder 24 has substantially the same curvature as an outer periphery face of the hydrogen tank 20 in a side view seen in the vehicle width direction.

A rectangular plate-shaped flange portion 25 is integrally formed at a front end portion and at a rear end portion of each holder 24. The flange portions 25 at the front end portion and the rear end portion protrude to, respectively, the vehicle body front side and the vehicle body rear side. Penetrating holes (not shown in the drawings) for the insertion of bolts 36 are formed in the flange portions 25. Weld nuts 38 that are coaxial with the penetrating holes (see FIG. 1) are fixed to lower faces of the flange portions 25.

Left and right pairs of brackets 22 are integrally provided at the outer periphery face of each hydrogen tank 20. The respective brackets 22 protrude to the vehicle body front side and the vehicle body rear side. Each bracket 22 is formed in a rectangular flat plate shape. Penetrating holes (not shown in the drawings) for the insertion of the bolts 36 are formed in the brackets 22.

Thus, when each hydrogen tank 20 is placed on the seats 18, the brackets 22 are superposed with the flange portions 25 of the holders 24 from above. Accordingly, the penetrating holes in the brackets 22 and the penetrating holes in the flange portions 25 are in communication with one another, and the bolts 36 are inserted into the respective penetrating holes and screwed into the weld nuts 38. Thus, a structure is formed in which the hydrogen tank 20 is fixed to the seats 18.

As shown in FIG. 1, the vicinity information detection sensor 30 is provided on the upper face 16A of the roof panel 16 at the vehicle body front side relative to the plural hydrogen tanks 20. The vicinity information detection sensor 30 constitutes an element of an autonomous driving system and also constitutes an element of the arrangement structure 10 according to the present exemplary embodiment. A controller (not shown in the drawings) is provided in the fuel cell bus 12. The controller is electrically connected to the vicinity information detection sensor 30 and constitutes an element of the autonomous driving system.

When a driver is not driving, the fuel cell bus 12 is capable of running autonomously by the controller controlling acceleration, steering and the like on the basis of vicinity information detected by the vicinity information detection sensor 30. The fuel cell bus 12 is configured to be selectively switchable between a manual driving mode in which the driver is driving and an autonomous driving mode in which the controller is driving.

Figure 3:
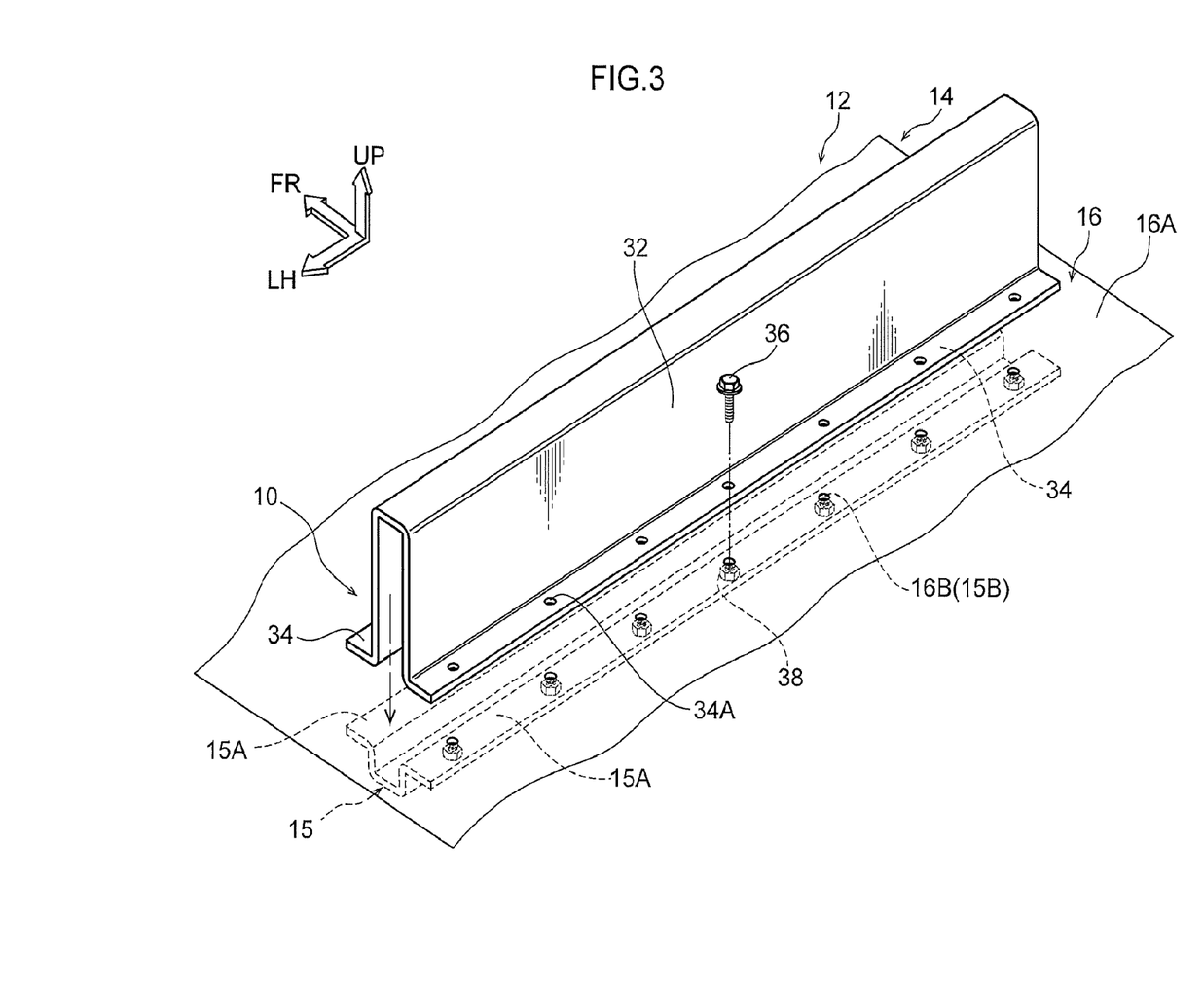
FIG. 3 is a magnified perspective view showing fixing portions of the barrier wall structuring the arrangement structure for a vicinity information detection sensor in accordance with the first exemplary embodiment.

A barrier wall 32 is fixed to the upper face 16A of the roof panel 16 between the plural hydrogen tanks 20 and the vicinity information detection sensor 30. The barrier wall 32 serves as an obstruction portion that constitutes an element of the arrangement structure 10 according to the present exemplary embodiment. As shown in FIG. 2 and FIG. 3, the barrier wall 32 is fabricated of metal (or fabricated of a resin with a high stiffness equivalent to metal). The barrier wall 32 is formed with a substantial inverted U-shaped cross section (a substantial hat shaped cross section) and extends in the vehicle width direction.

That is, a length of the barrier wall 32 in the vehicle width direction is set to, for example, a length substantially the same as the length of each hydrogen tank 20 in the axial direction thereof (see FIG. 2). Flange portions 34 projecting to each of the vehicle body front side and the vehicle body rear side are formed integrally at a lower end portion of the barrier wall 32. Plural penetrating holes 34A are formed in the flange portions 34, spaced apart in the vehicle width direction.

A roof cross-member 15 fabricated of metal is provided at a portion of a lower face of the roof panel 16. The roof cross-member 15 is formed in a hat shape in cross section, extending in the vehicle width direction. Plural numbers (matching numbers of the penetrating holes 34A) of penetrating holes 16B and penetrating holes 15B, spaced apart in the vehicle width direction, are formed in the roof panel 16 and each of flange portions 15A of the roof cross-member 15. The penetrating holes 16B and penetrating holes 15B are in communication with one another. The weld nuts 38 are attached to lower faces of the flange portions 15A of the roof cross-member 15, to be coaxial with the penetrating holes 15B.

Thus, a structure is formed in which the barrier wall 32 is fixed to the upper face 16A of the roof panel 16 by the barrier wall 32 being disposed on the upper face 16A of the roof panel 16 such that the plural penetrating holes 34A formed in the flange portions 34 are in communication with the plural penetrating holes 16B formed in the roof panel 16; the bolts 36 being inserted into the penetrating holes 34A, the penetrating holes 16B and the penetrating holes 15B; and the bolts 36 being screwed into the weld nuts 38.

Figure 4:
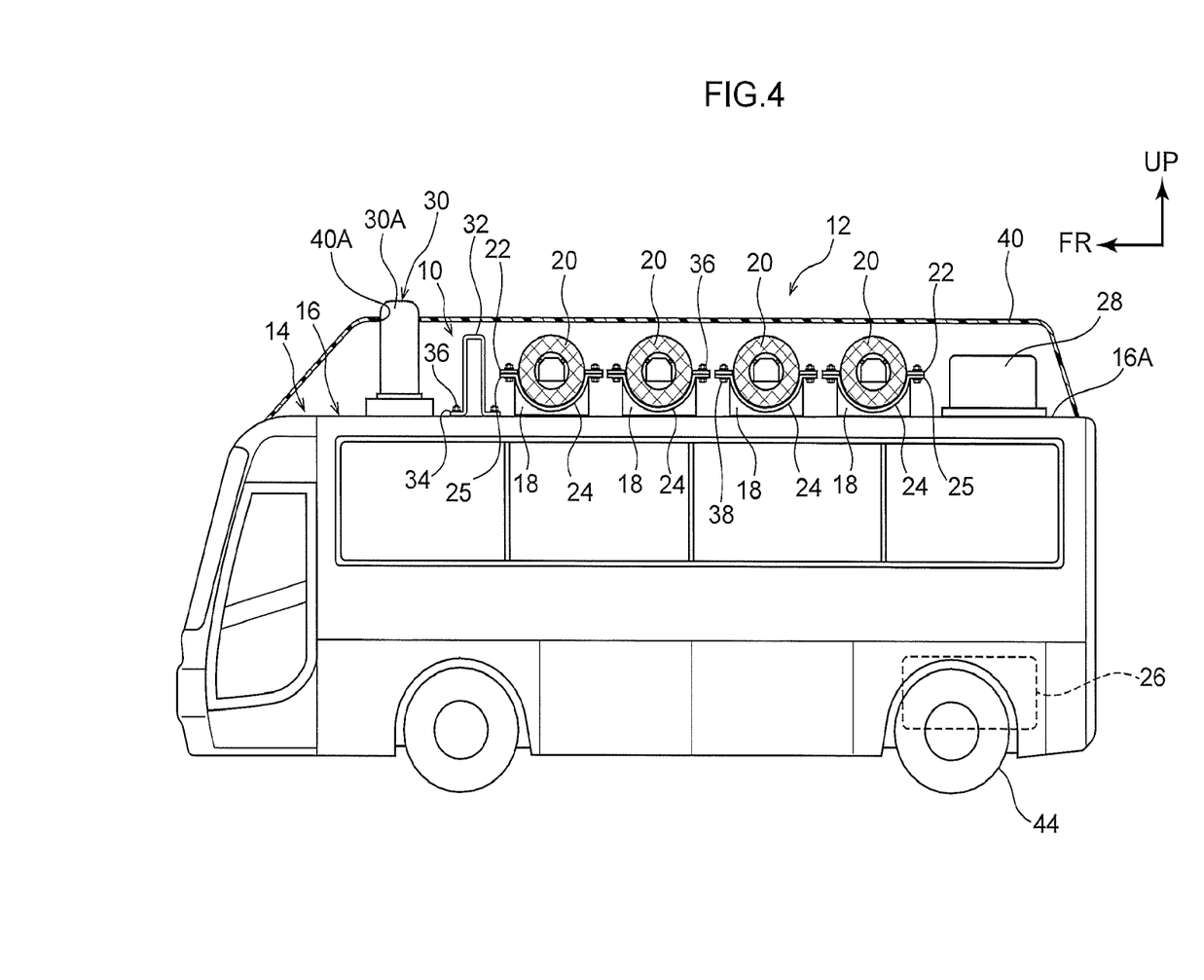
FIG. 4 is a side view showing a variant example of the fuel cell bus that is equipped with the arrangement structure for a vicinity information detection sensor in accordance with the first exemplary embodiment.

As shown in FIG. 1, an electric motor 26 for driving rear wheels 44 and a fuel cell stack (not shown in the drawings) are disposed at a rear portion of the fuel cell bus 12. In order to assure space for vehicle occupants, a structure may be formed in which, for example, as shown in FIG. 4, a fuel cell stack 28 is fixed at the rear portion side of the upper face 16A of the roof panel 16. Abnormality detection sensors (not shown in the drawings) or hydrogen leak detection sensors (not shown in the drawings) that detect if any of the hydrogen tanks 20 detach from the seats 18 are also disposed at the upper face 16A of the roof panel 16.

A cover body 40 fabricated of resin is provided on the upper face 16A of the roof panel 16. The cover body 40 structures design surfaces of the fuel cell bus 12. To describe this in more specific terms, the cover body 40 is formed with a size that covers the whole of the upper face 16A of the roof panel 16, and flange portions (not shown in the drawings) formed at lower end portions of the cover body 40 are joined to the upper face 16A of the roof panel 16 by bolt-fastening, adhesive or the like.

Thus, a structure is formed in which the hydrogen tanks 20 (and the fuel cell stack 28), the barrier wall 32 and the vicinity information detection sensor 30 are covered in the vehicle body front-and-rear direction and in the vehicle width direction by the cover body 40. As shown in FIG. 1 and FIG. 4, a top portion 30A of the vicinity information detection sensor 30 protrudes upward through an opening 40A in the cover body 40.

Now, operations of the arrangement structure 10 of the vicinity information detection sensor 30 according to the first exemplary embodiment with the above structure are described.

When the fuel cell bus 12 is running in the autonomous driving mode, if the bolts 36 fixing the brackets 22 detach from the weld nuts 38 and, for example, the hydrogen tank 20 closest to the front leaves its seats 18, that hydrogen tank 20 rolls on the upper face 16A of the roof panel 16. However, because the barrier wall 32 extending in the vehicle width direction is provided between the frontmost hydrogen tank 20 and the vicinity information detection sensor 30, that hydrogen tank 20 is effectively obstructed from coming into contact with the vicinity information detection sensor 30.

In other words, the hydrogen tank 20 may be prevented from striking the vicinity information detection sensor 30 and damage to the vicinity information detection sensor 30 by the hydrogen tank 20 is prevented. Accordingly, when a detachment of the fixing of a hydrogen tank 20 is detected during running in the autonomous driving mode by an abnormality detection sensor (or hydrogen leak detection sensor) or the like, the fuel cell bus 12 may promptly and autonomously proceed with retreat running.

Therefore, because the fuel cell bus 12 can continue with retreat running in the autonomous driving mode for some time, an emergency stop by the fuel cell bus 12 in an inappropriate location such as in the middle of a road, within an intersection or the like may be avoided. When the barrier wall 32 is formed with the substantial inverted U-shaped cross section, stiffness thereof is enhanced compared to a structure that is not formed with a substantial inverted U-shaped cross section. Therefore, in the first exemplary embodiment, the hydrogen tank 20 may be more effectively obstructed from coming into contact with the vicinity information detection sensor 30.

—Second Exemplary Embodiment—

Now, the arrangement structure 10 of the vicinity information detection sensor 30 in accordance with a second exemplary embodiment is described. Portions that are the same as in the above-described first exemplary embodiment are assigned the same reference numerals and, as appropriate, are not described in detail.

Figure 5:
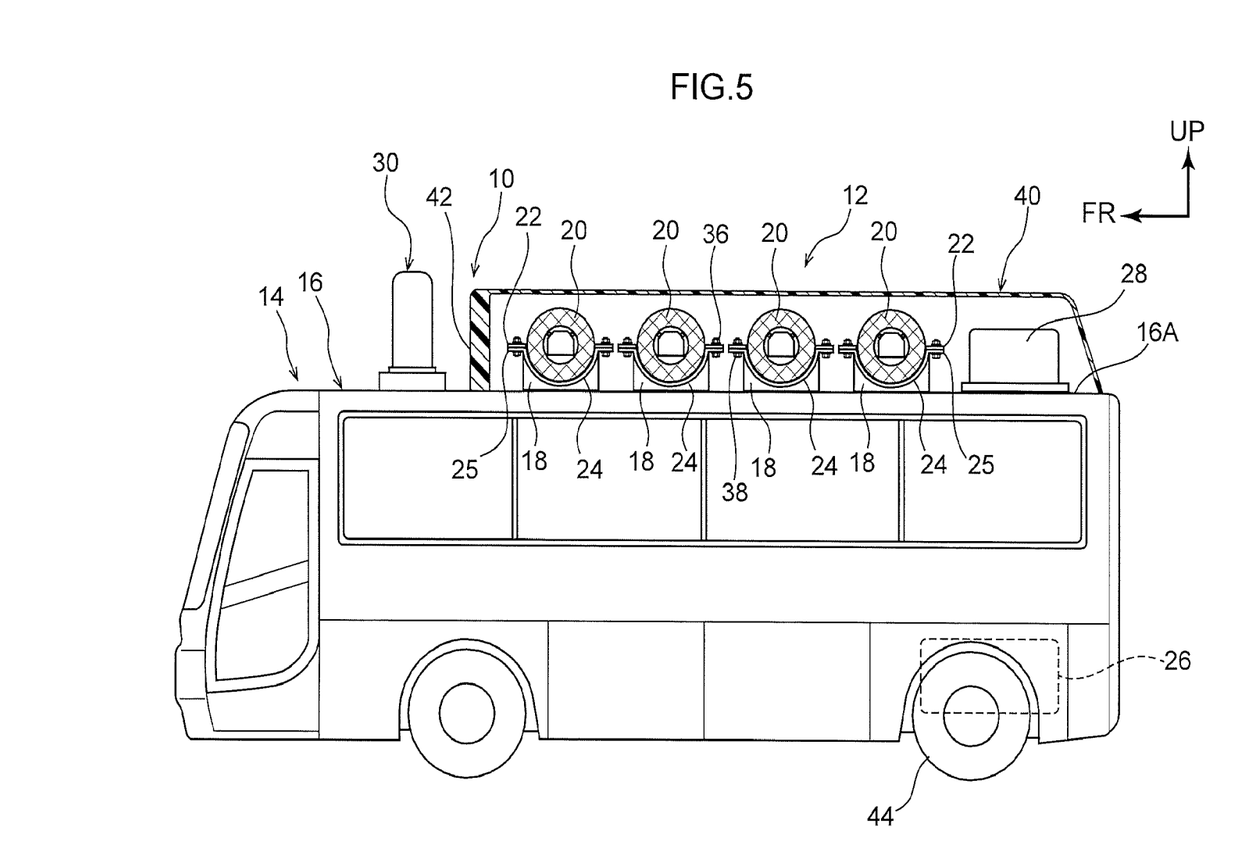
FIG. 5 is a side view showing a fuel cell bus that is equipped with an arrangement structure for a vicinity information detection sensor in accordance with a second exemplary embodiment.

As shown in FIG. 5, in this fuel cell bus 12, a length of the cover body 40 provided on the upper face 16A of the roof panel 16 at the vehicle body front side is shorter than a length at the vehicle body front side of the cover body 40 according to the first exemplary embodiment. That is, the cover body 40 is formed in a shape that covers only the hydrogen tanks 20 (and the fuel cell stack 28) in the vehicle body front-and-rear direction and in the vehicle width direction but does not cover the vicinity information detection sensor 30.

A front wall 42 of the cover body 40 is a wall portion that is disposed at the vehicle body rear side of the vicinity information detection sensor 30 (that opposes the vicinity information detection sensor 30 in the vehicle body front-and-rear direction). At least the front wall 42 of this cover body 40 is reinforced. To describe this in more specific terms, at least the front wall 42 is formed with a plate thickness that is greater than the plate thicknesses of left and right side walls, a rear wall and the like of the cover body 40. In the second exemplary embodiment, the front wall 42 serves as the obstruction portion that obstructs the hydrogen tank 20 from coming into contact with the vicinity information detection sensor 30.

Now, operations of the arrangement structure 10 of the vicinity information detection sensor 30 according to the second exemplary embodiment with the above structure are described.

When the fuel cell bus 12 is running in the autonomous driving mode, if the bolts 36 fixing the brackets 22 detach from the weld nuts 38 and, for example, the hydrogen tank 20 closest to the front leaves the seats 18, that hydrogen tank 20 rolls on the upper face 16A of the roof panel 16. However, because the hydrogen tanks 20 are covered by the cover body 40, and the front wall 42 extending in the vehicle width direction is provided between the frontmost hydrogen tank 20 and the vicinity information detection sensor 30, that hydrogen tank 20 is effectively obstructed from coming into contact with the vicinity information detection sensor 30.

In other words, the hydrogen tank 20 may be prevented from striking the vicinity information detection sensor 30 and damage to the vicinity information detection sensor 30 by the hydrogen tank 20 is prevented. Accordingly, when a detachment of the fixing of a hydrogen tank 20 is detected during running in the autonomous driving mode by an abnormality detection sensor (or hydrogen leak detection sensor) or the like, the fuel cell bus 12 may promptly and autonomously proceed with retreat running.

Therefore, because the fuel cell bus 12 can continue with retreat running in the autonomous driving mode for some time, an emergency stop by the fuel cell bus 12 in an inappropriate location such as in the middle of a road, within an intersection or the like may be avoided. Because at least the front wall 42 of the cover body 40 is reinforced and the stiffness thereof is enhanced, the hydrogen tanks 20 may be more effectively obstructed from coming into contact with the vicinity information detection sensor 30 in the second exemplary embodiment too.

Moreover, in the second exemplary embodiment there is no need to provide the barrier wall 32 as in the first exemplary embodiment described above. It is sufficient just to appropriately modify the design of the shape of the already existing cover body 40 (and reinforce the front wall 42). Therefore, there is an advantage in that the hydrogen tank 20 may be obstructed from coming into contact with the vicinity information detection sensor 30 efficiently (i.e., without increasing the number of components).

Hereabove, the arrangement structure 10 of the vicinity information detection sensor 30 according to the present exemplary embodiments has been described on the basis of the attached drawings. However, the arrangement structure 10 according to the present exemplary embodiments is not limited to the illustrated structures; suitable design modifications may be applied within a scope not departing from the gist of the present invention. For example, the obstruction portion according to the first exemplary embodiment is not limited to the barrier wall 32 but may be structured by a railing or by one or a plural number of rods or the like, which are not shown in the drawings.

The barrier wall 32 according to the first exemplary embodiment is not limited to the structure whose length in the vehicle width direction is substantially the same as the length in the axial direction of each hydrogen tank 20; the barrier wall 32 may be formed to be a little shorter or longer. Further, the front wall 42 according to the second exemplary embodiment is not limited to the structure that is reinforced by the plate thickness being increased. Structures are possible that are reinforced by, for example, providing a brace or the like. Means for fixing the hydrogen tanks 20 are not limited to the fixing portions shown in the drawings. For example, structures are possible in which the hydrogen tanks 20 are fixed by, for example, wires, metal bands or the like, which are not shown in the drawings.

In the fuel cell bus 12 according to the first exemplary embodiment shown in FIG. 1 and FIG. 4, the top portion 30A of the vicinity information detection sensor 30 protrudes upward through the opening 40A formed in the cover body 40, but this is not limiting. Structures are possible in which the whole of the vicinity information detection sensor 30 is covered by the cover body 40 (i.e., the top portion 30A does not protrude from the cover body 40).

What is claimed is:

1. An arrangement structure for a vicinity information detection sensor, the arrangement structure comprising:
   a vicinity information detection sensor provided on a roof of a fuel cell bus; and
   a reinforced wall provided between the vicinity information detection sensor and a hydrogen tank disposed on the roof, the reinforced wall obstructing the hydrogen tank from coming into contact with the vicinity information detection sensor, wherein
   the reinforced wall is a barrier wall that is fixed on the roof, and
   the barrier wall is formed with an inverted U-shaped cross section.

2. The arrangement structure for a vicinity information detection sensor according to claim 1, wherein:
   the hydrogen tank is covered by a cover body provided on the roof, and
   the reinforced wall is a portion of the cover body that opposes the vicinity information detection sensor.

3. The arrangement structure for a vicinity information detection sensor according to claim 2, wherein at least the portion of the cover body has a greater plate thickness than a plate thickness of another portion of the cover body.

4. An arrangement structure for a vicinity information detection sensor, the arrangement structure comprising:
   a vicinity information detection sensor provided on a roof of a fuel cell bus; and
   an obstruction portion provided between the vicinity information detection sensor and a hydrogen tank disposed on the roof, the obstruction portion obstructing the hydrogen tank from coming into contact with the vicinity information detection sensor,
   wherein the obstruction portion is formed with an inverted U-shaped cross section.

* * * * *